(12) United States Patent
Murakami et al.

(10) Patent No.: US 6,414,072 B2
(45) Date of Patent: *Jul. 2, 2002

(54) FLAME-RETARDANT THERMOPLASTIC RESIN COMPOSITION AND PRODUCTS OF INJECTION MOLDING THEREOF

(75) Inventors: Haruji Murakami; Mineo Ohtake; Kazuhito Kobayashi, all of Shizuoka (JP)

(73) Assignee: Polyplastics Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/402,094

(22) PCT Filed: Apr. 1, 1998

(86) PCT No.: PCT/JP98/01506

§ 371 (c)(1),
(2), (4) Date: Sep. 29, 1999

(87) PCT Pub. No.: WO98/44049

PCT Pub. Date: Aug. 10, 1998

(30) Foreign Application Priority Data

Apr. 2, 1997 (JP) ............................................... 9-84084

(51) Int. Cl.$^7$ .......................... C08K 3/32; C08K 5/5419
(52) U.S. Cl. ....................... 524/464; 524/265; 524/412; 524/414; 524/437
(58) Field of Search ................................ 524/412, 265, 524/417, 414; 525/437

(56) References Cited

U.S. PATENT DOCUMENTS

| | | | | |
|---|---|---|---|---|
| 3,671,487 A | * | 6/1972 | Abolins ...................... | 524/412 |
| 4,439,578 A | * | 3/1984 | Kim et al. .................. | 524/538 |
| 4,532,290 A | * | 7/1985 | Jaquiss et al. .............. | 524/417 |
| 4,981,898 A | * | 1/1991 | Bassett ....................... | 524/417 |
| 5,252,653 A | * | 10/1993 | Helmond ..................... | 524/409 |
| 5,367,011 A | * | 11/1994 | Walsh ........................ | 524/417 |
| 5,643,988 A | * | 7/1997 | Nakamura et al. ........... | 524/371 |
| 5,646,209 A | * | 7/1997 | Furuta et al. ................ | 525/437 |
| 5,679,288 A | * | 10/1997 | Kim et al. ................... | 524/136 |
| 5,830,940 A | * | 11/1998 | Nakamura et al. ........... | 524/404 |
| 6,010,760 A | * | 1/2000 | Miyazaki et al. ......... | 525/44 X |
| 6,043,310 A | | 3/2000 | Liu et al. | |
| 6,117,542 A | * | 9/2000 | Nauba et al. ................ | 428/412 |

FOREIGN PATENT DOCUMENTS

| | | |
|---|---|---|
| EP | 0685526 A2 | 12/1995 |
| JP | 61-69866 A | 4/1986 |
| JP | 07179743 A | 7/1995 |
| JP | 07331051 A | 12/1995 |
| JP | 08053607 A | 2/1996 |
| JP | 09031310 A | 2/1997 |
| JP | 09059524 A | 3/1997 |

* cited by examiner

*Primary Examiner*—Peter Szekely
(74) *Attorney, Agent, or Firm*—Burns, Doane, Swecker & Mathis LLP

(57) ABSTRACT

A flame-retardant thermoplastic resin composition, which comprises a polymer alloy composed of a thermoplastic resin (A) and a liquid-crystal polymer (B), is excellent in the stability of the heat retentivity imparted thereto in the injection molding step, exhibits an extremely high reinforcing effect which has been unattainable heretofore because the liquid-crystal polymer can be readily fiberized in the molding step, an[0084] provides moldings excellent in flame retardancy. Injection moldings comprising a liquid-crystal polymer (B) in the form of fibers having an average aspect ratio of at least 6 and micro-dispersed in a matrix phase comprising a thermoplastic resin (A), are produced by injection-molding a flame-retardant thermoplastic resin composition obtained by blending 100 parts by weight of the resin component comprising:

(A) 99 to 50 parts by weight of a thermoplastic resin not forming an anisotropic molten phase and (B) 1 to 50 parts by weight of a liquid-crystal polymer capable of forming an anisotropic molten phase with:

(C) 1.0 to 20 parts by weight of a halogen-containing organic compound and (D) 0.01 to 10 parts by weight of a fluorine compound.

30 Claims, No Drawings

FLAME-RETARDANT THERMOPLASTIC RESIN COMPOSITION AND PRODUCTS OF INJECTION MOLDING THEREOF

BACKGROUND OF THE INVENTION

1. Technical Field to which the Invention Belongs

The present invention relates to a flame-retardant thermoplastic resin composition obtained by blending (A) a thermoplastic resin which forms no anisotropic molten phase and (B) a liquid-crystal polymer capable of forming an anisotropic molten phase with (C) a halogen-containing organic compound and (D) a fluorine compound, and injection moldings thereof.

2. Prior Art

An alloy of a thermoplastic resin and a liquid-crystal polymer has been so far known for a material having excellent characteristics as a thin molding material, as described in JP-A 7-179743. This alloy is a material having both an inexpensiveness of the thermoplastic resin and mechanical properties and an easy moldability of the liquid-crystal polymer. Further, the greatest characteristics of this alloy are that the liquid-crystal polymer is readily fiberized through injection-molding to exhibit a much higher reinforcing effect than ever, and that the properties of the resulting moldings are therefore so specific that thin moldings excellent particularly in the mechanical strength can be provided. However, in the recent electric and electronic fields, the flame retardancy has been often required from necessity. In order to have a resin flame-retardant, it is considered that a combination of a usual flame retardant and a usual flame retardant aid is blended with it, like with a general thermoplastic resin. Nevertheless, in case of this alloy, there have been problems that, when an antimony compound or the like often used as a flame retardant aid is employed, a catalytic activity acts in imparting heat retentivity and a reaction arises between a thermoplastic resin and a liquid-crystal polymer, so that fibers of the liquid-crystal polymer to be inherently formed in a matrix phase of the thermoplastic resin in the injection-molding can not be formed, for which a thin moldability and a high rigidity, as one of the characteristics of this composition, are impaired.

DISCLOSURE OF THE INVENTION

Summary of the Invention

The present inventors have assiduously conducted investigations in view of the above-mentioned problems, and have consequently found that a thermoplastic resin composition, having an excellent stability of a heat retentivity imparted when injection-molding it, exhibiting an extremely high reinforcing effect which has been heretofore unattainable because the liquid-crystal polymer can be readily fiberized in moldings by injection-molding this, and also having an excellent flame retardancy, can be obtained by blending a resin component composed of (A) a thermoplastic resin and (B) a liquid-crystal polymer with (C) a halogen-containing organic compound and (D) a fluorine compound. This finding has led to completion of the present invention.

That is, an object of the present invention is a flame-retardant thermoplastic resin composition wherein 100 parts by weight of a resin component composed of 99 to 50 parts by weight of a thermoplastic resin (A) not forming an anisotropic molten phase and 1 to 50 parts by weight of a liquid-crystal polymer (B) capable of forming an anisotropic molten phase are blended with 1.0 to 20 parts by weight of a halogen-containing organic compound (C) and 0.01 to 10 parts by weight of a fluorine compound (D). Another object of the present invention is injection moldings obtained by injection-molding said flame-retardant thermoplastic resin composition, wherein the liquid-crystal polymer (B) is micro-dispersed in the form of fibers having an average aspect ratio of at least 6 in a matrix phase of the thermoplastic resin (A).

Detailed Description of the Invention

Hereinafter, the constitution of the present invention will be described in detail.

The thermoplastic resin (A) not forming an anisotropic molten phase used in the present invention may be any thermoplastic resin usually used, and examples thereof include polyolefin (co)polymer such as polyethylene, polypropylene and poly(4-methylpentene-1), polyester resin such as polyethylene terephthalate resin, polybutylene terephthalate resin and polycarbonate resin, polyamide polymer, syndiotactic polystyrene (SPS) resin, ABS resin, polyarylene sulfide resin, polyacrylarylate resin, polyacetal resin, polyphenylene oxide resin and a resin mainly comprising them. One or more of these resins may be used.

Among them, polyester resin such as polycarbonate resin and polybutylene terephthalate resin, SPS resin and polyarylene sulfide resin are preferable in respect of the thermal resistance, and the polycarbonate resin is especially preferable because it has relatively low molding shrinkage and linear expansion coefficient. Moreover, the polyester resin, especially the polycarbonate resin has the remarkable effect of the present invention in that, when an antimony compound or the like is used as usual, a catalytic activity acts in imparting a heat retentivity and a reaction to the liquid-crystal polymer tends to occur.

The thermoplastic resin of the present invention includes one provided with desired properties by adding additives to the thermoplastic resin, for example, nucleating agent, pigment such as carbon black, antioxidant, stabilizer, plasticizer, lubricant, mold releasing agent and flame retardant.

The liquid-crystal polymer (B) used in the present invention refers to a melt-processed polymer with the property that it can form an optically anisotropic molten phase.

The properties of an anisotropic molten phase can be confirmed by the conventional polarization inspection method using orthogonal polarizers. More specifically, confirmation of anisotropy in a molten phase can be attained by using a Leitz polarization microscope and observing a molten sample mounted on a Leitz hot stage under the nitrogen atmosphere at a magnification of 40 times. The liquid-crystal polymer usable in the present invention exhibits an optical anisotropy wherein a polarized light penetrates even in a static molten phase, when observed between cross polarizers.

As the liquid-crystal polymer usable in the present invention, aromatic polyester and aromatic polyester amide are an aromatic polyester or a liquid-crystal aromatic polyester amide containing at least one compound selected from the group consisting of aromatic hydroxycarboxylic acid, aromatic hydroxyamine and aromatic diamine.

More specifically, the followings are cited:

1) polyester or polyester amide mainly comprising one or two or more of aromatic hydroxycarboxylic acid, aromatic aminocarboxylic acid and derivatives thereof;

2) polyester or polyester amide mainly comprising
   a) one or two or more of aromatic hydroxycarboxylic acid, aromatic aminocarboxylic acid and derivatives thereof,
   b) one or two or more of aromatic dicarboxylic acid, alicyclic dicarboxylic acid, aliphatic dicarboxylic acid and derivatives thereof, and
   c) one or two or more of aromatic diol, alicyclic diol, aliphatic diol and derivatives thereof;
3) polyester amide mainly comprising
   a) one or two or more of aromatic hydroxycarboxylic acid, aromatic aminocarboxylic acid and derivatives thereof,
   b) one or two or more of aromatic hydroxyamine, aromatic diamine and derivatives thereof, and
   c) one or two or more of aromatic dicarboxylic acid, alicyclic dicarboxylic acid, aliphatic dicarboxylic acid and derivatives thereof;
4) polyester amide mainly comprising
   a) one or two or more of aromatic hydroxycarboxylic acid, aromatic aminocarboxylic acid and derivatives thereof,
   b) one or two or more of aromatic hydroxyamine, aromatic diamine and derivatives thereof,
   c) one or two or more of aromatic dicarboxylic acid, alicyclic dicarboxylic acid, aliphatic dicarboxylic acid and derivatives thereof, and
   d) one or two or more of aromatic diol, alicyclic diol, aliphatic diol and derivatives thereof;
5) polyester or polyester amide mainly comprising
   a) one or two or more of aromatic hydroxycarboxylic acid, aromatic aminocarboxylic acid and derivatives thereof, and
   b) one or two or more of aromatic dicarboxylic acid, alicyclic dicarboxylic acid, aliphatic dicarboxylic acid and derivatives thereof; and
6) polyester or polyester amide mainly comprising
   a) one or two or more of aromatic hydroxycarboxylic acid, aromatic aminocarboxylic acid and derivatives thereof, and
   b) one or two or more of aromatic diol, alicyclic diol, aliphatic diol and derivatives thereof.

Furthermore, a molecular weight modifier may be used together with the above-mentioned components if necessary. Examples of the molecular weight modifier include a monofunctional component such as benzoic acid, phenol and p-phenylphenol.

Preferred examples of the concrete compounds constituting the above-described liquid-crystal polymer usable in the present invention include: aromatic hydroxycarboxylic acid such as p-hydroxybenzoic acid, m-hydroxybenzoic acid, 6-hydroxy-2-naphthoic acid and 5-hydroxy-1-naphthoic acid; aromatic aminocarboxylic acid such as p-amino benzoic acid and m-amino benzoic acid; aromatic diol such as 2,6-dihydroxy naphthalene, 1,4-dihydroxy naphthalene, 1,5-dihydroxy naphthalene, 2,7-dihydroxy naphthalene, 4,4'-dihydroxy biphenyl, hydroquinone, resorcin and compounds represented by the following general formulas (I) or (II); aliphatic glycol represented by ethylene glycol and 1,4-butanediol; aromatic dicarboxylic acid such as terephthalic acid, isophthalic acid, 4,4'-biphenyl dicarboxylic acid, 3,4'-biphenyl dicarboxylic acid, 2,6-naphthalene-dicarboxylic acid, 2,7-naphthalene dicarboxylic acid, 1,4-naphthalene dicarboxylic acid, 1,5-naphthalene dicarboxylic acid and compounds represented by the following general formula (III); and aromatic diamine such as p-aminophenol, m-aminophenol, 1,4-phenylene diamine and 1,4-phenylene diamine;

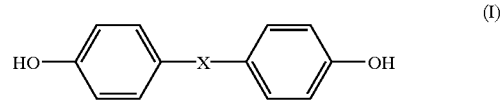

(I)

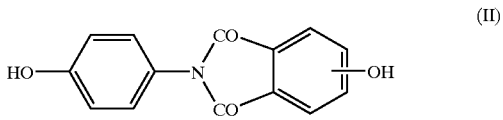

(II)

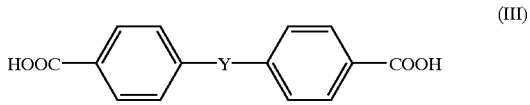

(III)

wherein X denotes a group selected from alkylene ($C_1$ to $C_4$), alkylydene, —O—, —SO—, —$SO_2$—, —S—, —CO—, and Y denotes a group selected from —$(CH_2)_n$— (in which n is 1 to 4), —$O(CH_2)_nO$— (in which n is 1 to 4).

Further, the liquid-crystal polymer used in the present invention may be a polyalkylene terephthalate which partially does not form an anisotropic molten phase in the same molecular chain, in addition to the aforementioned components. In this case, the number of carbons in the alkyl group is 2 to 4.

Among the above-described components, a further preferable example is one containing, as the essential component (s), one or two or more compounds selected from the group consisting of naphthalene compounds, biphenyl compounds and para-substituted benzene compounds. Among the p-substituted benzene compounds, p-hydroxy benzoic acid, methyl hydroquinone and 1-phenylethyl hydroquinone are especially preferred.

Examples of the compound having an ester formed functional group as the components and the polyester forming an anisotropic molten phase preferably used in the present invention are described in JP-B 63-36633.

The aromatic polyester and polyester amide described above generally show an inherent viscosity (I.V.) of at least about 2.0 dl/g, for example, about 2.0 to 10.0 dl/g when dissolved in pentafluorophenol with a concentration of 0.1 wt % at 60° C.

The ratio of the thermoplastic resin (A) to the liquid-crystal polymer (B) [(A)/(B)] in the present invention is between 99/1 and 50/50, preferably between 99/1 and 80/20. When (A)/(B) is higher than 99/1, the fiberized liquid-crystal polymer does not show a substantial reinforcing effect and there is almost no superiority to the properties of the thermoplastic resin (A) alone. On the contrary, when (A)/(B) is lower than 50/50, the matrix is the liquid-crystal polymer (B), so that the properties of the thermoplastic resin can not be undesirably used to advantage.

The halogen-containing organic compound (C) used in the present invention may be any halogen-containing compound ordinarily used as a flame retardant, for example, low-molecular halogenated organic compounds such as a halogenated phenyl, a halogenated diphenyl ether, a halogenated aromatic bisimide compound, a halogenated aromatic epoxy compound and bisphenol A, a halogenated polycarbonate, a halogenated benzyl acrylate, and a halogenated polystyrene. As a halogen, bromine is generally preferable. The especially preferable component (C) is a brominated polycarbonate.

The amount of the halogen-containing organic compound (C) to be blended is between 1.0 and 20 parts by weight, preferably between 5.0 and 15 parts by weight, based on 100 parts by weight of the resin component composed of 99 to 50 parts by weight of the thermoplastic resin (A) and 1 to 50 parts by weight of the liquid-crystal polymer (B). When the amount is less than 1.0 part by weight, the effect of flame-retardancy is decreased. When it is more than 20 parts by weight, the mechanical strength is deteriorated.

The fluorine compound (D) used in the present invention is not particularly limited so long as it is a synthetic compound containing a fluorine atom in a molecule. Among them, a fluororesin is preferable, and polytetrafluoroethylene is especially preferable. Further, even if the fluororesin, the properties of the powder thereof are greatly different depending on the production method. Accordingly, a polymer as polymerized by an ordinary polymerization method is more preferable because it becomes such a fluororesin that is fiberized with a shearing force in the present invention.

The amount of the fluorine compound (D) to be blended is between 0.01 and 10 parts by weight, preferably between 0.05 and 5 parts by weight, based on 100 parts by weight of the resin component composed of 99 to 50 parts by weight of the thermoplastic resin (A) and 1 to 50 parts by weight of the liquid-crystal polymer (B). When it is less than 0.01 part by weight, there is no effect of preventing the melt drop of the thermoplastic resin as a flame retardant aid. When it exceeds 10 parts by weight, the mechanical strength is deteriorated.

In the present invention, it is efficient that the liquid-crystal polymer (B) is previously micro-dispersed in the matrix phase in order that the liquid-crystal polymer (B) is oriented in the fibrous state in the matrix phase at an average aspect ratio of at least 6 in the injection-molding. It is therefore preferable that the components (E) and (F) are blended as dispersion aids for micro-dispersing the liquid-crystal polymer (B) in the matrix phase.

As the inorganic compound of phosphoric acid, phosphorous acid and metal salts thereof (E) of the present invention, metaphosphoric acid, orthophosphoric acid, metaphosphate, orthophosphate and hydrogen orthophosphate are cited. As metals constituting the metal salts, Group Ia and IIa elements of the Periodic Table are preferable from the standpoint of the effect of blending. For example, sodium metaphosphate, sodium phosphate, monosodium phosphate, disodium phosphate, trisodium phosphate, monobasic calcium phosphate, dibasic calcium phosphate, tribasic calcium phosphate, mono-potassium phosphate, di-potassium phosphate and tri-potassium phosphate are cited.

The amount of the component (E) to be blended is between 0.01 and 1.0 part by weight, preferably between 0.03 and 0.5 part by weight, based on 100 parts by weight of the resin component composed of 99 to 50 parts by weight of the thermoplastic resin (A) and 1 to 50 parts by weight of the liquid-crystal polymer (B). When it is less than 0.01 part by weight, an effect of fiberizing the liquid-crystal polymer during the molding is decreased. When it exceeds 1.0 part by weight, the mechanical strength is deteriorated.

The phosphoric acid or phosphorous acid ester (F) of the present invention includes tetrakis(2,4-di-t-butylphenyl)-4, 4'-biphenylene phosphonite, bis(2,6-di-t-butyl-4-methylphenyl)pentaerythritol-diphosphite, bis(2,4-di-t-butylphenyl)pentaerythritol-diphosphite and tris(2,4-di-t-butylphenyl)phosphite. A phosphorous acid ester is preferable, and a pentaerythritol-type phosphorous acid ester is especially preferable.

The amount of the component (F) to be blended is between 0.01 and 3.0 parts by weight, preferably between 0.1 and 1.5 parts by weight, based on 100 parts by weight of the resin component composed of 99 to 50 parts by weight of the thermoplastic resin (A) and 1 to 50 parts by weight of the liquid-crystal polymer (B). When it is less than 0.01 part by weight, an effect of fiberizing the liquid-crystal polymer during the molding is decreased. When it exceeds 3.0 parts by weight, the mechanical strength is deteriorated.

Next, the silane compound (G) in the present invention is a component which is preferably added in order to prevent from delamination on the surface of an article. Herein, the silane compound (G) is one or two or more member(s) selected from vinylalkoxysilane, aminoalkoxysilane and mercaptoalkoxysilane; examples of vinylalkoxysilane include vinyltriethoxysilane, vinyltrimethoxysilane and vinyltris(β-methoxyethoxy)silane; examples of aminoalkoxysilane include γ-aminopropyltrimethoxysilane, γ-aminopropyltriethoxysilane, γ-aminopropylmethyldimethoxysilane, N-(β-aminoethyl)-γ-aminopropyltrimethoxysilane, N-phenyl-γ-amonipropyltrimethoxysilane; and mercaptane, γ-mercaptopropyltrimethoxysilane are cited.

The amount of the silane component (G) to be blended is 0.01 to 3.0 parts by weight, preferably 0.03 to 1.5 parts by weight, based on 100 parts by weight of the resin component comprising 99 to 50 parts by weight of the thermoplastics resin (A) and 1 to 50 parts by weight of the liquid-crystal polymer (B). When the blended amount of the component (G) is less than 0.01 part by weight, the effect of improving delamination on the layer is hardly observed. When the amount exceeds 3.0 parts by weight, elasticity modulus and strength are deteriorated.

The thermoplastic resin composition of the present invention can be blended with various types of fibrous, powder, plate or hollow inorganic fillers according to the purposes of application. Two or more of these may be used together.

As the fibrous filler, various fibers such as glass fibers, carbon fibers, whiskers, metallic fibers, inorganic fibers and mineral fibers can be used.

Examples of the powder or particulate filler include silicates such as kaolin, clay, vermiculite, talc, calcium silicate, aluminum silicate, feldspar powder, acid clay, pyrophyllite clay, sericite, sillimanite, bentonite, glass powder, glass beads, slate powder and silane; carbonates such as calcium carbonate, chalk, barium carbonate, magnesium carbonate and dolomite; sulfates such as barite powder, blanc fixe, precipitated calcium sulfate, calcined gypsum and barium sulfate; hydroxides such as hydrated alumina; oxides such as alumina, antimony oxide, magnesia, titanium oxide, zinc oxide, silica, silica sand, quartz, white carbon and diatomaceous earth; sulfides such as molybdenum disulfide; metallic particles; and others.

Examples of tabular fillers include mica, glass flakes, various metal foils and the like.

As the hollow filler, hollow glass beads and the like are available.

The amount of the filler to be blended in the present invention is between 15 and 100 parts by weight, especially preferably between 30 and 75 parts by weight, based on 100 parts by weight of the resin component composed of the component (A) and the component (B).

In a method for obtaining the moldings of the present invention, wherein the liquid-crystal polymer (B) is micro-dispersed in the form of fibers having the average aspect ratio of at least 6 in the matrix phase of the thermoplastic resin (A), the kneading is conducted with a usual extruder and the injection-molding is conducted at such a temperature that is more than an incipient fluidization temperature of the liquid-crystal polymer (B), preferably at least 10° C. higher than the incipient fluidization temperature thereof, and more than an incipient fluidization temperature of the thermoplastic resin (A) not forming an anisotropic molten phase, preferably at least 10° C. higher than the incipient fluidization temperature thereof, whereby the moldings are obtained by a shearing force in the injection-molding. Since the moldings of the present invention are obtained by using not the antimony compound but the fluorine compound, the liquid-crystal polymer can be micro-dispersed in the form of fibers even in the heat retention at the time of the molding, and the mechanical properties are not influenced by the molding conditions.

The moldings of the present invention become those having excellent mechanical properties because the liquid-crystal polymer plays a part of a fiber reinforcing material. The fiber herein referred to is a liquid-crystal polymer having a fibrous or needle-like structure with an average aspect ratio of at least 6, and it includes also a product having a fibrous structure branched from a fiberized trunk fiber.

The above-mentioned incipient fluidization temperature means a temperature at which to show a fluidity by an external force when a resin is heated. It can be measured by the method described later.

EXAMPLES

Hereinafter, the present invention will be described in more detail with reference to the following examples, but the present invention is not limited to the examples. Evaluation methods are as follows:

(Combustibility)

A combustion test piece having a thickness of 0.8 mm was molded, and evaluated by a combustion test of UL94.

(Flexural Modulus)

A flexural modulus (MPa) of a bending test piece having a thickness of 0.8 mm was measured according to ASTM D 790.

(Stability of Heat Retentivity)

Pellets were plasticized in a cylinder of a molding machine, and then allowed to cool for 30 minutes. Thereafter, a flexural modulus (MPa) of a test piece having the thickness of 0.8 mm was measured according to ASTM D 790.

(Average Aspect Ratio of Fibrous Liquid-Crystal Polymer)

After the test piece used in the measurement of the flexural modulus was cut to expose a plane parallel with a fluidity direction, the cross section was mirror-polished, and the center of its surface was observed by an electronic microscope to evaluate. That is, the length/thickness of each of 50 arbitrarily selected fibrous liquid-crystal polymers was measured. An apparently observable length was regarded as the length of fiber. As for evaluation, an average aspect ratio of 6 or more is expressed as a circle, while an average aspect ratio of less than 6 as a cross.

(Test of Peeling Tape)

The test piece used in the measurement of flexural modulus was used, and an adhesive tape having an area of 5 cm$^2$ was stuck on around the gate of the specimen. The tape was peeled off at a constant rate, and an area of resin portion sticking to the adhesive tape was measured. As for evaluation, a peel area of less than 0.5 cm$^2$ is expressed as a circle, a peel area of 0.5 to 1.0 cm$^2$ as a triangle, and an area of more than 1.0 cm$^2$ as a cross.

(Incipient Fluidization Temperature)

It was expressed in terms of a temperature at which the melt viscosity was 48,000 poises when a sample resin, being heat-melted at a heating rate of 4° C./min, was extruded from a nozzle having an inner diameter of 1 mm and a length of 10 mm under a load of 100 kg/cm$^2$, as measured using a capillary rheometer (Flow Tester Model CFT-500, manufactured by Shimadzu Corp.).

Comparative Examples 1 to 3

100 parts by weight of a resin component containing 78 parts by weight of a polycarbonate resin (manufactured by Teijin Chemicals Ltd., incipient fluidization temperature: 185° C.) and 22 parts by weight of a liquid-crystal polymer (Vectra A950, manufactured by Polyplastics Co., Ltd., incipient fluidization temperature: 265° C.) were blended with the component (C) and the component (E) or the component (F), and further, antimony trioxide shown in Table 1 at ratios shown in Table 1. These were melt-kneaded at a resin temperature of 300° C. with a 30 mm twin-screw extruder, and pelletized. Subsequently, the pellets were formed into test pieces with an injection molding machine at a molding temperature of 300° C., and subjected to the above-mentioned evaluation. The results are shown in Table 1.

Examples 1 to 4 and Comparative Examples 4 to 7

100 parts by weight of a resin component containing a polycarbonate resin (manufactured by Teijin Chemicals Ltd., incipient fluidization temperature: 185° C.) and a liquid-crystal polymer (Vectra A950, manufactured by Polyplastics Co., Ltd., incipient fluidization temperature: 265° C.) at ratios shown in Table 1 were blended with the component (C), the component (D) and the component (E) or the component (F) and further, as required, the component (G) shown in Table 1 at ratios shown in Table 1. These were melt-kneaded at a resin temperature of 300° C. with a 30 mm twin-screw extruder, and pelletized. Subsequently, the pellets were formed into test pieces with an injection-molding machine at a molding temperature of 300° C., and subjected to the above-mentioned evaluation. The results are shown in Table 1.

Examples 5 to 8

100 parts by weight of a resin component containing a polybutylene terephthalate resin (manufactured by Polyplastics Co., Ltd., (IV=1.0), incipient fluidization temperature: 237° C.) and a liquid-crystal polymer (Lodrun LC3000, manufactured by Unitika Ltd., incipient fluidization temperature: 182° C.) at ratios shown in Table 2 were blended with the component (C), the component (D), the component (E) or the component (F) and further, as required, the component (G) shown in Table 2 at ratios shown in Table 2. These were melt-kneaded at a resin temperature of 260° C. with a 30 mm twin-screw extruder, and pelletized. Subsequently, the pellets were formed into test pieces with an injection-molding machine at a molding temperature of 250° C., and subjected to the above-mentioned evaluation. The results are shown in Table 2.

The components used in the tables are as follows;

Polytetrafluoroethylene; Phostaflon TF1620, manufactured by Hoechst Industry K.K., Phosphorous acid ester; bis(2,4-di-t-butylphenyl) pentaerythritol diphosphite, and Antimony tetraoxide; PATOX-L, manufactured by Nihon Seiko Co., Ltd.

TABLE 1

|  |  | Ex. 1 | Com. Ex. 1 | Com. Ex. 2 | Com. Ex. 3 | Ex. 2 | Com. Ex. 4 | Com. Ex. 5 | Com. Ex. 6 | Com. Ex. 7 | Ex. 3 | Ex. 4 |
|---|---|---|---|---|---|---|---|---|---|---|---|---|
| Composition (pts by wt) | (a) polybutylene terephthalate | 78 | 78 | 78 | 78 | 67 | 79 | 73 | 78 | 73 | 78 | 78 |
|  | (b) liquid crystal polymer | 22 | 22 | 22 | 22 | 33 | 21 | 27 | 22 | 27 | 22 | 22 |
|  | (c) brominated polycarbonate | 11 | 11 | 11 | 11 | 10 | 0.5 | 25 | 11 | 11 | 11 | 11 |
|  | (d) polytetrafluoroethylene | 0.2 | 1.5* | 1.5* | 0.5* | 0.2 | 0.2 | 0.2 | 0.2 | 15 | 0.2 | 0.2 |
|  | (e) calcium primary phosphate | 0.05 | 0.05 |  | 0.05 | 0.05 | 0.05 | 0.05 | 0.05 | 0.05 |  | 0.05 |
|  | (f) phosphorous acid ester |  |  | 0.3 |  |  |  |  |  |  | 0.3 |  |
|  | (g) γ-aminopropyl-triethoxysilane |  |  |  |  |  |  |  |  |  |  | 0.1 |
| Evaluation | Flame retardancy | V-0 | V-0 | V-0 | V-1 | V-0 | HB | V-0 | HB | V-0 | V-0 | V-0 |
|  | Flexural modulus (MPa) | 6000 | 5800 | 5700 | 5900 | 8000 | 6150 | 4800 | 6100 | 4600 | 5900 | 6000 |
|  | Stability of heat retentivity (MPa) | 6100 | 2800 | 2600 | 2900 | 8100 | 6100 | 4500 | 6100 | 4200 | 6000 | 6100 |
|  | Average aspect ratio | ○ | ○ | ○ | ○ | ○ | ○ | ○ | ○ | ○ | ○ | ○ |
|  | Delamination | ○ | Δ | Δ | Δ | Δ | Δ | Δ | Δ | X | ○ | ○ |

*antimony trioxide

TABLE 2

|  |  | Com. Ex. 5 | Com. Ex. 6 | Ex. 7 | Ex. 8 |
|---|---|---|---|---|---|
| Composition (pts by wt) | (a) Polybutylene terephthalate | 66 | 76 | 76 | 76 |
|  | (b) Liquid crystal polymer | 34 | 24 | 24 | 24 |
|  | (c) Brominated polycarbonate | 14 | 15 | 15 | 15 |
|  | (d) Polytetrafluoro-ethylene | 1.0 | 1.2 | 1.2 | 1.2 |
|  | (e) Calcium primary phosphate |  |  | 0.05 | 0.05 |
|  | (f) Phosphorous acid ester |  |  |  |  |
|  | (g) γ-aminopropyl-triethoxysilane |  |  |  | 0.1 |
| Evaluation | Flame retardancy | V-0 | V-0 | V-0 | V-0 |
|  | Flexural modulus (MPa) | 6100 | 4700 | 5000 | 4900 |
|  | Stability of heat retentivity (MPa) | 5900 | 4500 | 4700 | 4700 |
|  | Average aspect ratio | ○ | ○ | ○ | ○ |
|  | Delamination | Δ | Δ | Δ | Δ |

What is claimed is:

1. An injection molded flame-retardant thermoplastic resin product obtained by injection molding the blend of 100 parts by weight of the resin component comprising:
   (A) 99 to 50 parts by weight of a thermoplastic resin which forms no anisotropic molten phase, and
   (B) 1 to 50 parts by weight of a liquid-crystal polymer capable of forming an anisotropic molten phase, wherein said liquid-crystal polymer is micro-dispersed in the form of fibers having an average aspect ratio of at least 6 in the matrix phase comprising said thermoplastic resin with:
   (C) 1.0 to 20 parts by weight of a halogen-containing organic compound,
   (D) 0.01 to 10 parts by weight of a synthetic fluorine compound, and
   (E) 0.01 to less than 1.0 part by weight of at least one compound selected from the group consisting of phosphoric acid, phosphorous acid, and metal salts of the foregoing, said injection molding taking place at a temperature equal to or higher than the melting point temperature of (B).

2. The flame-retardant thermoplastic resin product according to claim 1, wherein the halogen-containing organic compound (C) is a brominated polycarbonate and the fluorine compound (D) is a fluororesin.

3. The flame-retardant thermoplastic resin product according to claim 1, wherein the fluorine compound (D) is a fluororesin which is fiberized by a shearing force.

4. The flame-retardant thermoplastic resin product according to claim 1, wherein the thermoplastic resin (A) is a polyester resin.

5. The flame-retardant thermoplastic resin product according to claim 1, wherein the thermoplastic resin (A) is a polycarbonate resins.

6. The flame-retardant thermoplastic resin product according to claim 1, wherein 100 parts by weight of the resin component comprising 99 to 50 parts by weight of the thermoplastic resin (A) and 1 to 50 parts by weight of the liquid-crystal polymer (B) are further blended with at least one silane compound (G) selected from among vinylalkoxysilanes, aminoalkoxysilanes and mercaptoalkoxysilanes in an amount of 0.01 to 3.0 parts by weight.

7. The flame-retardant thermoplastic resin product according to claim 2, wherein the fluorine compound (D) is a fluororesin which is fiberized by a shearing force.

8. The flame-retardant thermoplastic resin product according to claim 2, wherein the thermoplastic resin (A) is a polyester resin.

9. The flame-retardant thermoplastic resin product according to claim 3, wherein the thermoplastic resin (A) is a polyester resin.

10. The flame-retardant thermoplastic resin product according to claim 7, wherein the thermoplastic resin (A) is a polyester resin.

11. The flame-retardant thermoplastic resin product according to claim 3, wherein 100 parts by weight of the resin component comprising 99 to 50 parts by weight of the thermoplastic resin (A) and 1 to 50 parts by weight of the liquid-crystal polymer (B) are further blended with at least one compound (F) selected from among phosphoric and phosphorous esters in the amount of 0.01 to 3.0 parts by weight.

12. The flame-retardant thermoplastic resin product according to claim 2, wherein 100 parts by weight of the resin component comprising 99 to 50 parts by weight of the thermoplastic resin (A) and 1 to 50 parts by weight of the liquid-crystal polymer (B) are further blended with at least one silane compound (G) selected from among vinylalkoxysilanes, aminoalkoxysilanes and mercaptoalkoxysilanes in an amount of 0.01 to 3.0 parts by weight.

13. The flame-retardant thermoplastic resin product according to claim 3, wherein 100 parts by weight of the resin component comprising 99 to 50 parts by weight of the thermoplastic resin (A) and 1 to 50 parts by weight of the liquid-crystal polymer (B) are further blended with at least one silane compound (G) selected from among vinylalkoxysilanes, aminoalkoxysilanes and mercaptoalkoxysilanes in an amount of 0.01 to 3.0 parts by weight.

14. Injection moldings produced by injection-molding the flame-retardant thermoplastic resin product according to claim 2, characterized in that the liquid-crystal polymer (B) is micro-dispersed in the form of fibers having an average aspect ratio of at least 6 in the matrix phase comprising the thermoplastic resin (A).

15. The flame-retardant thermoplastic resin product according to claim 1 wherein liquid-crystal polymer (B) is fibrous in form.

16. The flame-retardant thermoplastic resin product according to claim 1 that additionally includes 0.01 to 3.0 parts by weight of at least one silane compound (G) selected from the group consisting of vinylalkoxysilanes, aminoalkoxysilanes and mercaptoalkylsilanes.

17. A flame-retardant thermoplastic resin product according to claim 1 wherein said halogen of said halogen-containing organic compound (C) is bromine.

18. An injection molded flame-retardant thermoplastic resin product obtained by injection molding the blend of 100 parts by weight of the resin component comprising:
   (A) 99 to 50 parts by weight of a thermoplastic resin which forms no anisotropic molten phase, and
   (B) 1 to 50 parts by weight of a liquid-crystal polymer capable of forming an anisotropic molten phase, wherein said liquid-crystal polymer is micro-dispersed in the form of fibers having an average aspect ratio of at least 6 in the matrix phase comprising said thermoplastic resin with:
   (C) 1.0 to 20 parts by weight of a halogen-containing organic compound,
   (D) 0.01 to 10 parts by weight of a synthetic fluorine compound, and
   (F) 0.01 to 3.0 parts by weight of at least one compound selected from the group consisting of phosphoric acid, and phosphorous acid, and metal salts of the foregoing, said injection molding taking place at a temperature equal to or higher than the melting temperature of (B).

19. A flame-retardant thermoplastic resin product according to claim 18 wherein said halogen of said halogen-containing organic compound (C) is bromine.

20. The flame-retardant thermoplastic resin product according to claim 18, wherein the halogen-containing organic compound (C) is a brominated polycarbonate and the fluorine compound (D) is a fluororesin.

21. The flame-retardant thermoplastic resin product according to claim 18, wherein the fluorine compound (D) is a fluororesin which is fiberized by a shearing force.

22. The flame-retardant thermoplastic resin product according to claim 18, wherein the thermoplastic resin (A) is a polyester resin.

23. The flame-retardant thermoplastic resin product according to claim 18, wherein the thermoplastic resin (A) is a polycarbonate resin.

24. The flame-retardant thermoplastic resin product according to claim 18, that additionally includes 0.01 to 3.0 parts by weight of at least one silane compound (G) selected from the group consisting of vinylalkoxysilanes, aminoalkoxysilanes and mercaptoalkylsilanes.

25. A method of injection molding a flame-retardant thermoplastic resin product by injecting the blend of 100 parts by weight of the resin component comprising:

(A) providing 99 to 50 parts by weight of a thermoplastic resin which forms no anisotropic molten phase, and
   (B) providing 1 to 50 parts by weight of a liquid-crystal polymer capable of forming an anisotropic molten phase, wherein said liquid crystal polymer is micro-dispersed in the form of fibers having an average aspect ratio of at least 6 in the matrix phase comprising said thermoplastic resin with:
   (C) 1.0 to 20 parts by weight of a halogen-containing organic compound,
   (D) 0.01 to 10 parts by weight of a synthetic fluorine compound, and
   (E) 0.01 to less than 1.0 part by weight of at least one compound selected from the group consisting of phosphoric acid, phosphorous acid, and metal salts of the foregoing, said injection molding taking place at a temperature equal to or higher than the melting point temperature of (B), the liquid-crystal polymer having a fibrous structure branched from a fiberized trunk fiber and wherein the injection molding is carried out at a temperature at least 10° C. higher than the incipient fluidization temperature of the liquid-crystal polymer (B).

26. The method for injecting a flame-retardant thermoplastic resin product according to claim 25, wherein the injection molding is carried out at a temperature higher than an incipient fluidization temperature of the liquid-crystal polymer (B).

27. The method for injecting a flame-retardant thermoplastic resin product according to claim 25, wherein the injection molding is carried out at a temperature higher than the incipient fluidization temperature of the thermoplastic resin (A).

28. The method for injecting a flame-retardant thermoplastic resin product according to claim 25, wherein the injection molding is carried out at a temperature at least 10° C. higher than the incipient fluidization temperature of the thermoplastic resin (A).

29. A method of injection molding a flame-retardant thermoplastic resin product by injecting the blend of 100 parts by weight of the resin component comprising:
   (a) injecting a polyolefin resin selected from the group consisting of polyethylene, polypropylene and poly (4-methylpentene-1) into a mold, wherein said polyolefin resin is free of an anisotropic molten phase; and
   (b) providing a liquid-crystal aromatic polyester amide containing at least one compound selected from the group consisting of aromatic hydrocarboxylic acid, aromatic hydroxyamine and aromatic diamine, wherein said liquid-crystal aromatic polyamide resin is micro-dispersed in the form of fibers with 5:15 parts by weight halogenated phenyl, 0.05 to 5 parts by weight polytetrafluoroethylene and 0.03:0.05 parts by weight metaphosphoric acid, said injection molding talking place at a temperature at least 10° C. higher than the melting temperature of said liquid-crystal aromatic polyester amide.

30. A method of injection molding a flame-retardant thermoplastic resin product by injecting the blend of 100 parts by weight of the resin component comprising:
   (A) providing 99 to 50 parts by weight of a thermoplastic resin which forms no anisotropic molten phase, and
   (B) providing 1 to 50 parts by weight of a liquid-crystal polymer capable of forming an anisotropic molten phase, wherein said liquid crystal polymer is microdispersed in the form of fibers having an average aspect ratio of at least 6 in the matrix phase comprising said thermoplastic resin with:

(C) 1.0 to 20 parts by weight of a halogen-containing organic compound, (D) 0.01 to 10 parts by weight of a synthetic fluorine compound, and (E) 0.01 to less than 1.0 part by weight of at least one compound selected from the group consisting of phosphoric acid, phosphorous acid, and metal salts of the foregoing, said injection molding taking place at a temperature equal to or higher than the melting point temperature of (B), the liquid-crystal polymer having a fibrous structure branched from a fiberized trunk fiber.

* * * * *